United States Patent [19]
MacPhail

[11] Patent Number: 5,089,956
[45] Date of Patent: Feb. 18, 1992

[54] METHOD OF DISTRIBUTING RELATED DOCUMENTS TO IDENTIFIED END USERS IN AN INFORMATION PROCESSING SYSTEM

[75] Inventor: Margaret G. MacPhail, Austin, Tex.

[73] Assignee: International Business Machines Corporation, Armonk, N.Y.

[21] Appl. No.: 277,390

[22] Filed: Nov. 29, 1988

[51] Int. Cl.$^5$ ............... G06F 15/40; G06F 15/403
[52] U.S. Cl. ................... 395/600; 364/225.4; 364/284.3; 364/284.4; 364/283.4; 364/974.4; 364/163.3; 364/162.2; 364/DIG. 1; 364/DIG. 2
[58] Field of Search ... 364/200 MS File, 900 MS File, 364/419

[56] References Cited
U.S. PATENT DOCUMENTS

| | | | |
|---|---|---|---|
| 4,358,016 | 11/1982 | Richardson et al. | 209/56 X |
| 4,404,649 | 9/1983 | Nunley et al. | 364/900 |
| 4,433,392 | 2/1984 | Beaven | 364/900 |
| 4,445,195 | 5/1984 | Yamamoto | 364/900 |
| 4,506,342 | 3/1985 | Yamamoto | 364/900 |
| 4,553,261 | 11/1985 | Froessl | 382/57 |
| 4,591,974 | 5/1986 | Dornbush et al. | 364/200 |
| 4,601,003 | 7/1986 | Yoneyama et al. | 364/58 |
| 4,631,664 | 12/1986 | Bachman | 364/200 |
| 4,656,343 | 5/1987 | Gerritsen et al. | 235/454 |
| 4,663,615 | 5/1987 | Hernandez et al. | 340/721 |
| 4,674,040 | 6/1987 | Barker et al. | 340/734 X |
| 4,712,174 | 12/1987 | Minkler | 364/200 |
| 4,807,182 | 2/1989 | Queen | 364/900 |
| 4,816,655 | 3/1989 | Musyck et al. | 235/380 |
| 4,843,538 | 6/1989 | Lane et al. | 364/188 |

FOREIGN PATENT DOCUMENTS 62-279425 12/1987 Japan.

OTHER PUBLICATIONS

Gary Franz "On-Line Engineering Document Control and Information System", Online 81, pp. 13-19.
Williams "Electronic Document Management: The Coming Revolution in Records Management", IMC Journal, Fourth Quarter 1985, pp. 33-37.
Cashrella "Document Management Software: New Twist to Proven Concept Results in Increased Productivity", Journal of Information & Image Management, 6/1986, pp. 27-29.
Abstract of Research Disclosure RD251002, Mar. 10, 1985, Industrial Opportunities Ltd. Havant GB.
Delisle et al., "Neptune: A Hypertext System for CAD Applications", ACM, Jan. 1986, pp. 132-143.
Halasz, "Reflections on Notecards: Seven Issues for the Next Generation of Hypermedia Systems", Communication of the ACM, vol. 31, No. 7, Jul. 1988, pp. 836-852.
Gregory, "Xanadu: Hypertext from the Future", Dr. Dobb's Journal, No. 75, Jan. 1983, pp. 28-35.

Primary Examiner—Thomas C. Lee
Assistant Examiner—Ken S. Kim
Attorney, Agent, or Firm—H. St. Julian; Douglas H. Lefeve; Mark E. McBurney

[57] ABSTRACT

This invention relates to a method of distributing documents have a directed relationship within an information processing system. The documents in the directed relationship have a one-to-one relationship. An end user indicates to the system an identification of at least one document in the directed relationship which is to be distributed to one or more recipient end user. The end user also enters system addresses of the recipient end users. The system then builds the necessary structures to transmit the document in the directed relationship to the identified recipient end users such that the directed relationship is maintained.

5 Claims, 5 Drawing Sheets

| PARAMETER | OCCURENCE | | | |
|---|---|---|---|---|
| ATTRIBUTE PARAMETER SET 71 | REQUIRED | | | |
| FOLDER PARAMETER SET 72 | CONDITIONAL | | | |
| DIF PARAMETER SET 73 | CONDITIONAL | | | |
| STAPLEE PARAMETER SET 74 | CONDITIONAL | | | |
| STAPLER PARAMETER SET 75 | CONDITIONAL | | | |

FIG. 3

| PARAMETER | OCCURRENCE | MODIFY | SYSTEM | |
|---|---|---|---|---|
| FOLDER ATTRIBUTE 77 | REQUIRED | NO | SET | |
| DIF ATTRIBUTE 78 | REQUIRED | NO | SET | |
| FOLDER - ONLY ATTRIBUTE 79 | REQUIRED | YES | - | |
| STAPLEE ATTRIBUTE 80 | REQUIRED | NO | SET | |
| STAPLER ATTRIBUTE 81 | REQUIRED | NO | SET | |

FIG. 4

| PARAMETER | OCCURRENCE | MODIFY | SYSTEM | |
|---|---|---|---|---|
| ATTRIBUTES 83 | REQUIRED | - | SET | |
| RELATED DOCUMENT 84 | REQUIRED | - | SET | |

FIG. 5

| SUBPARAMETER | OCCURRENCE |
|---|---|
| STAPLER LADN 86 | REQUIRED |
| DOCUMENT NAME 87 | REQUIRED |
| CONTEXT 88 | REQUIRED |
| ADD DATA 89 | REQUIRED |
| REMOVE DATA 90 | CONDITIONAL |

FIG. 6

METHOD OF DISTRIBUTING RELATED DOCUMENTS TO IDENTIFIED END USERS IN AN INFORMATION PROCESSING SYSTEM

CROSS-REFERENCES TO RELATED APPLICATIONS

This application is related in subject matter to the following applications filed concurrently herewith and assigned to a common assignee:

Application Ser. No. 07/277,385, now abandoned filed by M. G. MacPhail entitled "Method of Filing Stapled Documents within A Context of A Folder".

Application Ser. No. 07/277,369 filed by M. G. MacPhail entitled "Method of Filing Stapled Documents Within A Context of An Application".

Application Ser. No. 07/277,387, now abandoned filed by M. G. MacPhail entitled "Method of Filing Stapled Documents" which is the parent of continuation Application Ser. No. 07/631,193, filed Dec. 20, 1990 (AT9-88-044X).

The foregoing copending applications are incorporated herein by reference.

1. Technical Field

This invention relates to methods of managing documents in an information processing system and more particularly, to methods of distributing stapled documents to at least one end user within the information processing system.

2. Background Information

In recent times, automation of offices is rapidly becoming a reality for an increasing number of organizations. Office automation helps the organizations integrate data files with text, store and retrieve correspondence and reports electronically, distribute documents electronically and support the day-to-day activities of administrative personnel, professionals and managers.

While some of the benefits of electronic document processing can be realized from a single, stand-alone office system, a network which connects office systems in various locations in the organization increases the productivity of the organization. Physically, a network is a combination of interconnected pieces of equipment and programs used for moving information between points where it may be generated, processed, stored and used. From the viewpoint of an user of the network, the network is a collection of services which are useful in creating, revising, distributing, filing and retrieving documents.

In today's electronic office, documents are physically grouped or stored using one of the following techniques: partition data sets, directories and folders. Partition data sets are storage areas on a disk or other form of storage medium. Documents stored in a partition data set only exist in that storage area and a partition data set can not be deleted until all of the documents included therein have been removed. Generally, the documents are filed in the partition data set in the order created and there is no other relationship regarding the order to the documents.

Directories are similar to partition data sets in that they are physical storage areas for documents for files. Documents can not exist in more that one physical storage area. The documents contained in a directory are not logically organized.

In regards to both the partition data sets and the directories, if a user filed a group of documents which are related to a general topic and wanted to review the group of documents, the user would have to first locate the partition data set or sets or the directory or directories containing the documents. In partition data sets and directories, documents have to be deleted from the bottom up. Additionally, it is very difficult to rearrange documents stored or grouped using these two techniques. The documents must be copied and then deleted. Moreover, partition data sets, except for the contents thereof, can not be distributed. Directories can not be distributed in their entirety. Linear and hierarchical groupings can not be distributed using directories or partition data sets because the groupings mechanism utilized therewith will be lost. This type of operation technique reduces the efficiency of the electronic office.

Folders are documents which form hierarchical and linear relationship between a group of documents. Folders can be nested to form the hierarchical relationship whereby the group of documents within a folder are ordered to form the linear relationship. The documents within a folder are organized sequentially by a specified descriptor or by a specified position number. Access to a folder is independent from the documents contained therein. Documents within a folder can be manipulated as a single document, as a set of documents which comprise the entire folder or as a set of documents which comprise a specified level of the folder document.

A folder can be used to form a directed or one-to-one relationship between two documents. This requires the folder to be a first document and a document contained therein to be a second document. The relationship suffers in that not all documents are folders and if any other documents are entered into the folder, the one-to-one relationship between the first and the second document becomes unclear.

The use of partitioned data sets and directories in establishing directed relationships between two documents suffers from limitations which are similar to those as a result of using a folder. There is no way to identify which document is coupled to another, when more than two documents are included in a partitioned data set or directory, the one-to-one relationship is lost and the forms of grouping documents requires the creation of a new folder, directory or partition to establish the relationship.

Consequently, what is needed is a technique for distributing documents having a directed relationship without creating additional documents or groups.

DISCLOSURE OF THE INVENTION

This invention relates to methods of distributing at least two documents stored in an information processing system whereby the documents have a directed relationship. An end user indicates the documents having the directed relationship which are to be distributed to one or more recipient end users. The addresses of the recipient end users and the identification of at least one document which is stapled by another document are entered into the system. The system then builds the necessary structures to transmit the indicated documents to the identified recipient end user such that the relationship of documents is maintained.

BRIEF DESCRIPTION OF THE DRAWING

FIG. 3 is a table of object structures which are employed in generating a folder document.

FIG. 4 is a table of object structures for an attribute parameter set.

FIG. 5 is a table of object structures for staples section parameters.

FIG. 6 is a table of object structures for staples related document subparameters.

BEST MODE FOR CARRYING OUT THE INVENTION

Figure 1:
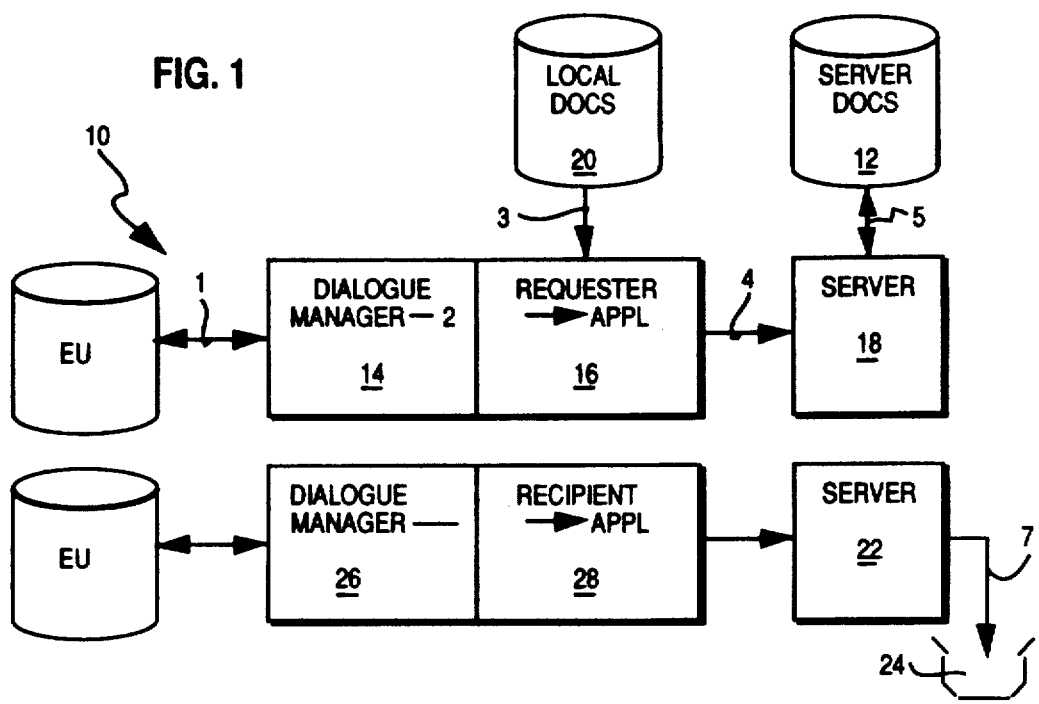
FIG. 1 is a block diagram of a document management system in accordance with the principles of the present invention.

FIG. 1 shows a document management system 10 which controls the creation, retrieval, editing and distribution of documents within an information processing system. Moreover, the document management system 10 enables an end user (EU) to distribute a pair of documents which are coupled together in a stapled relationship to another EU or set of EUs. In essence, a stapled pair of documents created to be distributed consists of documents copied from the EU's local storage, the server's storage or a combination of both. Thus, the EU creates the staple relationship by interacting with a dialogue manager application 14 providing the data which is necessary to distribute the stapled pair of documents to other EUs. The necessary data includes addressing information for all of the recipient EUs, distribution characteristics and a definition of the stapled pair of documents. The definition of the stapled pair includes an indication that a document is stapled by another document and pointers to the physical location of all of the documents to be distributed. These documents can be directly accessible to the Requester application 16 or they can be directly accessible to the Requester's server 18. If any document to be distributed is filed in a local storage 20, a stapled-document-option indicates whether or not all of the documents stored in the library and which are stapled to the specified document are to be distributed. After the dialogue manager application 14 has gathered the above-identified information, it transmits the information to the requester application program 16.

The requester application program 16, in response to input from the dialogue manager application 14, builds a distribution request and transmits the request to the requester's server 18. The requester application program 16 makes a copy of each of the locally accessible documents identified by the EU which are filed in a local storage medium 20. The copies of the documents are transmitted to the requester's server 18 along with the request. Additionally, the requester application program 16 transmits pointers to the physical location of all of the documents to be distributed which are filed in the library 12 and not otherwise identified by the folder document containing the documents.

The requester's server 18 makes a copy of all of the documents which were not received with the distribution request. The requester's server 18 will transmit all of the information received from the requester application program 16 along with copies of any documents filed in the local storage 20 to recipient servers, such as recipient server 22, associated with an recipient EU specified in the distribution request. Additionally, the requester's server 18 will transmit pointers to the physical location of all documents to be distributed in a distribution package.

The recipient server 22, in response to the input from the requester's server 18, then builds a stapler table-of-contents and a staplee table-of-contents and places a pointer to the resolved stapled pair in the recipient EU mail queue 24.

The document management system 10 shown in FIG. 1 utilizes a uniform structure for exchanging information within the system. This structure includes an encoding scheme which is designed to convey any document, irrespective of it content, from one type of office system to another and to communicate the intent of the person creating or transmitting a document as to the method of processing thereof. One type of structure which meets all of these requirements is the Document Interchange Architecture (DIA) which is a part of a DISOSS office system marketed by the International Business Machines Corporation.

DIA is a program-to-program communication architecture which defines the protocols and data structures that enable programs to interchange information such as documents and messages in a consistent and predictable manner. DIA is independent of the type of information managed by DIA services. DIA includes document objects which contain parameters or descriptors that describe the contents of the information being transmitted. The descriptors contained in the objects include the name under which the information is filed, the authors, the subject of the information and the date the information was filed in the document history. These descriptors enable a document to be searched in a storage medium such as the server library 12.

The server library 12 performs various services for the system 10. These services are used for storing and retrieving documents electronically. Whenever a document is filed in the server library 12, a set of descriptors called a document profile is filed with it. The profile contains the descriptors noted above. Document profiles are used in searching for documents in the library 12. For purposes of illustration and not limitation, a EU can ask the system 10 to search for all documents regarding a particular subject and by a certain author which was filed in the library 12 between any two dates. Upon completing the search, the system presents the EU with a list of the documents which meet the search criteria. The EU could then ask the system 10 to retrieve a copy of a specific document on the list from the library an deliver the copy the EU for printing or viewing.

The server library 12 also provides the following services: file documents in and retrieve or delete documents from the library; update work in progress documents in the library; specify a security level to associate with the document that is being filed; allow authorized end users other than the EU who filed the document to retrieve the document from the library and perform searches for and retrieve documents in the library for other end users. The server library 12 assigns each new document filed in therein a unique name called a library-assigned document name (LADN). This name is returned to the requester and can be used to uniquely identify the document at some later time.

Figure 2:
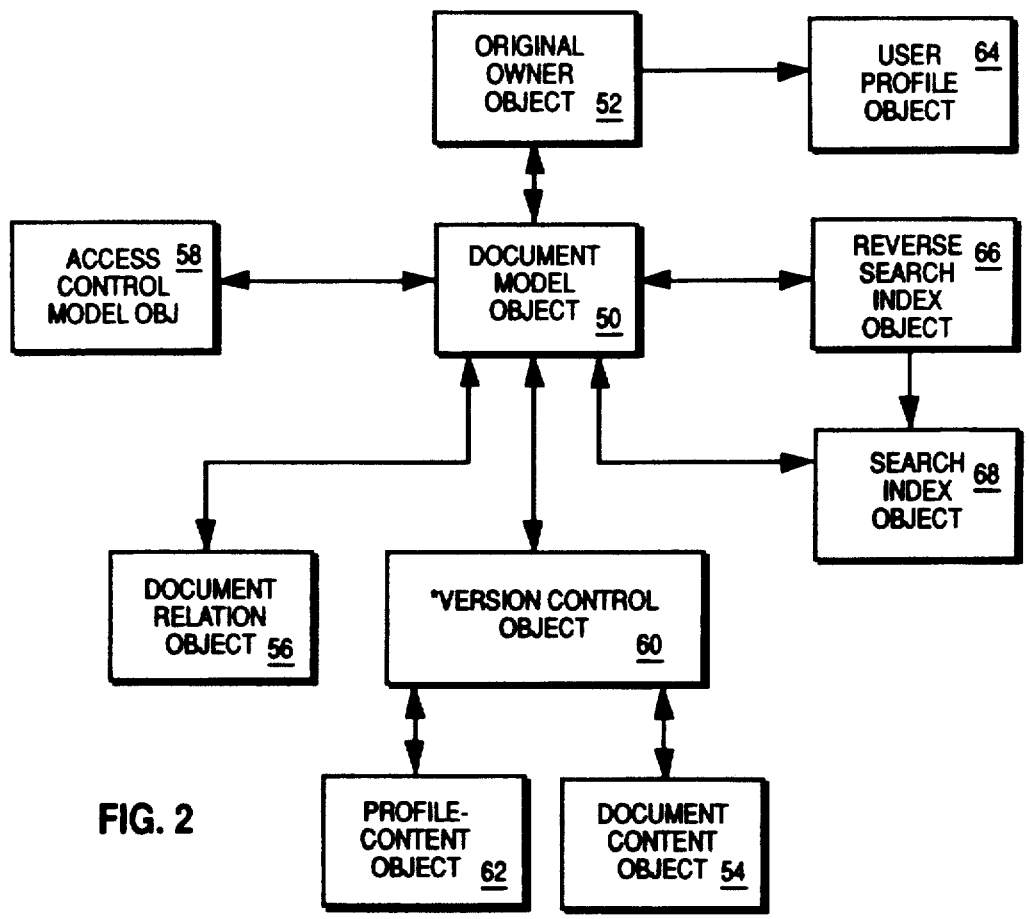
FIG. 2 is a model of a document showing the various objects associated with a document stored in the system of FIG. 1.

Referring to FIG. 2, each document stored in the server library 12 includes the objects shown therein. All of the objects shown in FIG. 2 are created in response to the processing a FILE command. A document model object 50 contains information concerning ownership and attributes of a specific document. This object controls the access to the document during its life in the library.

An original owner object 52 contains or points to information used by an owner of the document to control access to the document as filed.

A document content object 54 provides for the storage of the document content and for saving information relating to the actual size of the filed document.

A document relation object 56 describes the logical relationships between the document and other documents. If the document is a folder, each of the documents contained therein has a pointer or LADN entry in this object. If this document is in one or more folders, then each folder has a pointer or LADN entry in this object. Enter and remove history may be maintained for the document either as a folder or as a document in other folders.

An access control model object 58 is created when the document owner authorizes other users to access the document.

Other objects included in FIG. 2 are a version control object 60, profile content object 62, user profile object 64, reverse search index object 66 and search index object 68.

Structures for all of the above-identified objects except document relations object (DRO) are a part of the DISOSS office system and will not be described herein. Every document stored in system 10 has a document relations object associated therewith. FIG. 3 shows a table 70 of the structure of the DRO which consists of the following: an attribute parameter set 71, a folder document parameter set 72, a document-within-a-folder (DIF) parameter set 73, a staplee parameter set 74 and a stapler parameter set 75.

The attribute parameter set indicates whether or not the document associated with the DRO is a folder or whether or not the document is a 'folder-only' document. Additionally, the attribute parameter set indicates whether or not in a stapled relationship the associated document is designated as a "staplee" or as a "stapler" with respect to another document. A staplee document is a document which is stapled by another document. A stapler document is a document which is stapled to another document. FIG. 4 illustrates a table 76 of the structure for the attribute parameter set. A folder attribute 77 indicates whether or not the document associated with the document relation object is a folder. If the document is a folder, then a folder section parameter set is required. A DIF (document in folder) attribute 78 indicates whether or not the document is contained within any folders. A folder-only attribute 79 indicates whether or not the document can be viewed as existing on its own when it is included within a folder. Documents are viewed as folder-only when both the DIF and Folder-only attributes are positively set.

A physical document in a physical folder is a folder-only document. In essence, the physical document exists in the folder and can not stand on its own. However, electronic documents can logically exist in multiple places at the same time. Therefore, a document can appear to be in more than one folder and standing on its own all at the same time. Whether or not the document can stand on its own when it is also in a folder is indicated by the folder-only attribute. Folder-only documents are viewed as stand-alone when they are not contained by any folders.

The staplee attribute 80 indicates whether or not the document associated with the DRO is a stapled by another document. The stapler attribute 81 indicates whether or not the document associated with the DRO is stapled to another document.

FIG. 5 illustrates a table 82 of the structure for the staplee section parameters. The staplee parameters associated with the DRO is defined as a repository for information specific to a document stapled by another document. The staplee parameters are created when the associated with the DRO is stapled by another document. The staplee parameters are preserved with the document until the document is deleted from a document library or the document is unstapled by its last document. The attributes parameter 83 allows for the specification of a history option when the document is stapled and unstapled by another document. The history option includes a related document parameter set associated with the document is deleted when the document is unstapled by another document and created when the document is stapled by another document. Alternatively, the related document parameter 84 set is maintained when the document is unstapled by another document. The request date, time and requester's identification are added to the related document parameter set. When the document is restapled by the same document, the new staple date, time and the requester's identification are added to the related document parameter set.

The related document parameter set includes the following: a related document parameter introducer, the LADN of the document by which the document is stapled, an user-assigned document name of the other document, the context in which this document was stapled by the other document, the date and time this document was stapled by the other document, the identification of the staple requester, and the date and time the document was unstapled and the identification of the unstaple requester if the history option is specified.

FIG. 6 illustrates a table 85 of the structure for the staplee related document subparameters. The stapler LADN 86 is a unique name assigned to the other document by the server library when the other document was filed in the library. The document name 87 parameter identifies the other document by its user-assigned name. The context parameter 88 set specifies the context in which this document is stapled by the other document: the context can be all folders, a set of folders, an application, or a set of applications. The other document can appear in more than one folder. The context parameter can be used to specify in which folders this document appears to be stapled by the other document. Similarly, the context parameter can be used to specify that this document is stapled by the other document in the context of an application. For purposes of illustration and not limitation, an application used to highlight data in a document could create an overlay template and staple it to another document. When the application is used, the template highlights the data without disturbing the original document. Moreover, the template may not have any meaning outside of the context of the application.

The add data subparameter 89 specifies the date the document was stapled by the other document, the address of the requester. The remove data subparameter 90 specifies the date the document was unstapled by the other document and the address of the requester.

The stapler section of the DRO is defined as a repository for information specific to a document stapled to another document. The structures (not shown) associated with the stapler parameter set are identical those set forth above and in FIGS. 3 through 6 for the staplee parameter set except reference is made to the document stapled to another document.

Set out below is an illustration of an application program useable by the requester application 16 in distributing stapled documents within the information processing system. The program is in program design language from which source code and machine code are derivable.

```
BEGIN REQUESTER PROC
  INPUT
    ADDRESSING AND DISTRIBUTION
    CHARACTERISTICS.
    DO FOR EACH DOCUMENT EXPLICITLY
    IDENTIFIED
      IN THIS DISTRIBUTION REQUEST:
      A POINTER TO THE PHYSICAL DOCUMENT
      (PPTR) WHICH WILL BE EITHER A LOCAL
      POINTER OR A LIBRARY IDENTIFIER
        THE PHYSICAL DOCUMENT CONTAINS
        RELATED DATA OBJECTS WHICH DEFINE
        THE STAPLER AND STAPLEE
        CHARACTERISTICS OF THE DOCUMENT.
        THESE CHARACTERISTICS INCLUDE
        WHETHER OR NOT HISTORY IS TO BE
        MAINTAINED
      A UNIQUE IDENTIFIER FOR THIS DOCUMENT
      WITHIN THE SCOPE OF THE REQUEST.
      A REFERENCE IDENTIFIER FOR THE STAPLER
      DOCUMENT ATTACHED TO THE STAPLEE
      DOCUMENT.
      A STAPLED-DOCUMENT-OPTION FOR
      DOCUMENTS THAT ARE ATTACHED TO THE
      SPECIFIED DOCUMENT IN THE LIBRARY.
    ENDDO
  PROCESS
    SET THE STAPLED-DOCUMENT OPTION.
    DO FOR EACH DOCUMENT INDIVIDUALLY
    SPECIFIED
      BY USER REQUEST TO BE SENT IN THE
      DISTRIBUTION (BUILD AN IDD):
      IF THE DOCUMENT RESIDES ON THE
      LIBRARY,
        THEN
          SET THE DOCUMENT POINTER (PPTR) TO
          ITS LIBRARY IDENTIFIER.
        ELSE
          COPY THE DOCUMENT AND ITS
          RELATED OBJECT DATA.
          SET THE DOCUMENT ADDRESS (PPTR) TO
          POINT TO THE POSITION OF THE
          DOCUMENT IN THE REQUEST UNIT.
      ENDIF
      SET THE DOCUMENT IDENTIFIER (DID) TO
      THE SPECIFIED VALUE.
      IF THE DOCUMENT TO BE DISTRIBUTED IS TO
      BE STAPLED BY ANOTHER, THEN
        SET THE REFERENCED DOCUMENT
        IDENTIFIER (RID) AS SPECIFIED
        (RID = DID OF THE STAPLER)
      ENDIF
    ENDDO
  OUTPUT
    SEND COMPLETED DISTRIBUTION
    COMMAND TO
      REQUESTER SERVER.
END REQUESTER PROC
```

Figure 7:
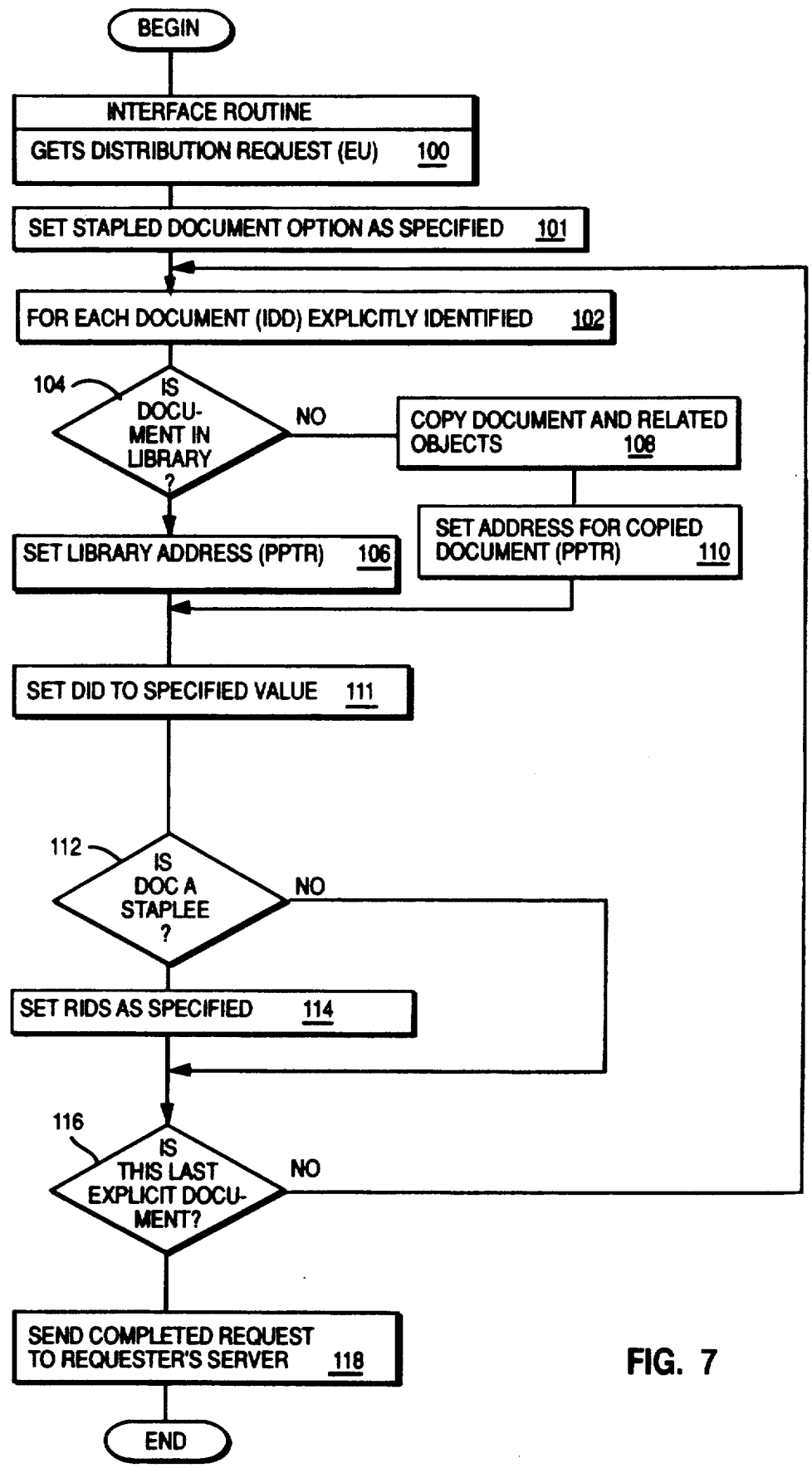
FIG. 7 is a flow chart illustrating detailed steps of the method of distributing stapled documents by the present invention.

Referring to FIG. 7, there is shown a flow chart for the requester application program in distributing stapled documents in the information processing system. First, the requester application program 16 interfaces with the dialogue manager application 14 in step 100 to get the distribution request which includes setting the stapled-document-option as specified by the EU. The stapled-document-option indicates whether or not library documents, which are to be distributed as a result of this request, will be distributed with any documents stapled thereto. The library documents or staplers which are stapled to the specified document or staplee will be found by the library server 12. Steps 102 and 104 determine for each document explicitly identified in the request whether the document is filed in the library 12. Thereafter the requester application 16 builds an identified data (IDD) operand for each document to be distributed which includes a pointer to the physical location of the document (PPTR); a unique document identifier within the scope of the command (DID); and references to any staplers attached to this document. If the document is filed in the library 12, step 106 sets the document pointer (PPTR) to an address which is accessible to the requester's server 18. If the document is not filed in the library 12, the document and its related objects are copied in step 108 and the document pointer (PPTR) is set equal to the address of the document unit within this request that contains a physical copy of the document and its related data areas in step 110.

In step 111, each IDD operand is associated with a unique identifier (DID) entered by the EU. Step 112 determines whether the document is a staplee document. Step 114 sets the reference identifiers (RIDs) associated with any documents stapled to the document equal to the identifier DID of the stapler document attached to the document associated with the IDD operand being built. This step is repeated for each stapler document attached to the document associated with the IDD operand. Step 116 determines whether the document is the last document specified by the EU. Steps 102 through 116 are repeated until all of specified documents have been processed. When all of the document have been processed, the requester application 16, in step 118, transmits a completed distribution request to the requester's server 18. The completed distribution request includes the addressing and distribution characteristics, the stapled-document-option, an IDD operand for each explicitly identified document and a document unit for each document passed with this request.

Set out below is an illustration of an application program useable by the requester's server 18 in distributing stapled documents within the information processing system. The program is in program design language from which source code and machine code are derivable.

```
BEGIN REQUESTER SERVER PROC
  INPUT
    A DISTRIBUTION REQUEST INCLUDING:
      ADDRESSING AND DISTRIBUTION
      CHARACTERISTICS.
      STAPLED-DOCUMENT-OPTION.
      AN IDD OPERAND FOR EACH DOCUMENT
      EXPLICITLY IDENTIFIED INCLUDING:
        A POINTER TO THE PHYSICAL COPY
        (PPTR);
        A UNIQUE IDENTIFIER (DID)
        FOR THIS IDD WITHIN THE SCOPE OF
        THE REQUEST; AND
```

```
      REFERENCE(S) (RIDS) FOR ANY
      DOCUMENTS STAPLED TO THIS
      DOCUMENT.
    A DOCUMENT UNIT FOR EACH DOCUMENT
    PASSED WITH THIS REQUEST INCLUDING THE
    FOLLOWING:
      STAPLER DATA AREA WHICH INCLUDES
      THE STAPLER HISTORY ATTRIBUTE AND
      OTHER STAPLER CHARACTERISTICS AND
      THE LIST OF DOCUMENTS TO WHICH
      THIS DOCUMENT IS ATTACHED.
      STAPLEE DATA AREA WHICH INCLUDES
      THE STAPLEE HISTORY ATTRIBUTE AND
      OTHER STAPLEE CHARACTERISTICS AND
      THE LIST OF DOCUMENTS BY WHICH
      THIS DOCUMENT IS ATTACHED.
      FOLDER DATA.
      DOCUMENT-IN-FOLDER DATA.
      DOCUMENT DESCRIPTORS.
      DOCUMENT CONTENT.
  PROCESS
    SET NDID = TO HIGHEST DID VALUE PASSED
    WITH THE REQUEST.
    DO FOR EVERY IDD PASSED IN THE COMMAND,
    IF THE DOCUMENT IS IN THE LIBRARY, THEN
      COPY THE DOCUMENT AND ITS RELATED
      OBJECT DATA.
      SET THE DOCUMENT ADDRESS (PPTR) TO
      POINT TO THE POSITION OF THE
      DOCUMENT IN THE NEW REQUEST UNIT.
      IF THE DOCUMENT IS STAPLED AND THE
      STAPLED-DOCUMENT-OPTION IS SET
      TO DISTRIBUTE THE ATTACHED
      DOCUMENTS (STAPLERS), THEN
        DO FOR EACH DOCUMENT STAPLED
        TO THE REFERENCED DOCUMENT
          IF THE DOCUMENT HAS NOT
          BEEN COPIED IN THIS
          REQUEST BEFORE, THEN
            COPY THE DOCUMENT
            AND ITS RELATED
            OBJECT DATA.
            SET THE DOCUMENT
            ADDRESS (PPTR) TO
            POINT TO THE
            POSITION OF THE
            DOCUMENT IN THE NEW
            REQUEST UNIT.
            SET THE DOCUMENT
            IDENTIFIER TO A
            UNIQUE VALUE WITHIN
            THE COMMAND
            (DID=NDID+1).
            SET NDID=NDID+1
          ENDIF
          SET THE REFERENCED
          DOCUMENT IDENTIFIER TO
          CORRESPOND TO THE
          STAPLER DOCUMENT
          IDENTIFIER FOR THE
          STAPLEE (STAPLEE
          RID=STAPLER DID).
        ENDDO
      ENDIF
    ENDIF
    ENDDO
    PASS THE NEW TOTALLY RESOLVED REQUEST
    UNIT TO THE TRANSPORT FOR DELIVERY TO
    THE ADDRESS DESTINATION.
END REQUESTER SERVER PROC
```

The requester's server 18, in response to the distribution request generated by the requester application program 16, builds a new operand (IDD) for each document that it copies from its addressable library 12. The new IDD is necessary because the document will have a pointer to the document unit within the request instead of a unique library pointer. Stapler documents which are copied from the server library 12 were not transmitted with an IDD from the requester application program 16. Thus, these documents require a new IDD as well. Each additional IDD must have an unique identifier within the command to be sent to the requester's server 18. A NDID value is a temporary counter to show the highest DID value currently assigned.

Figure 8:
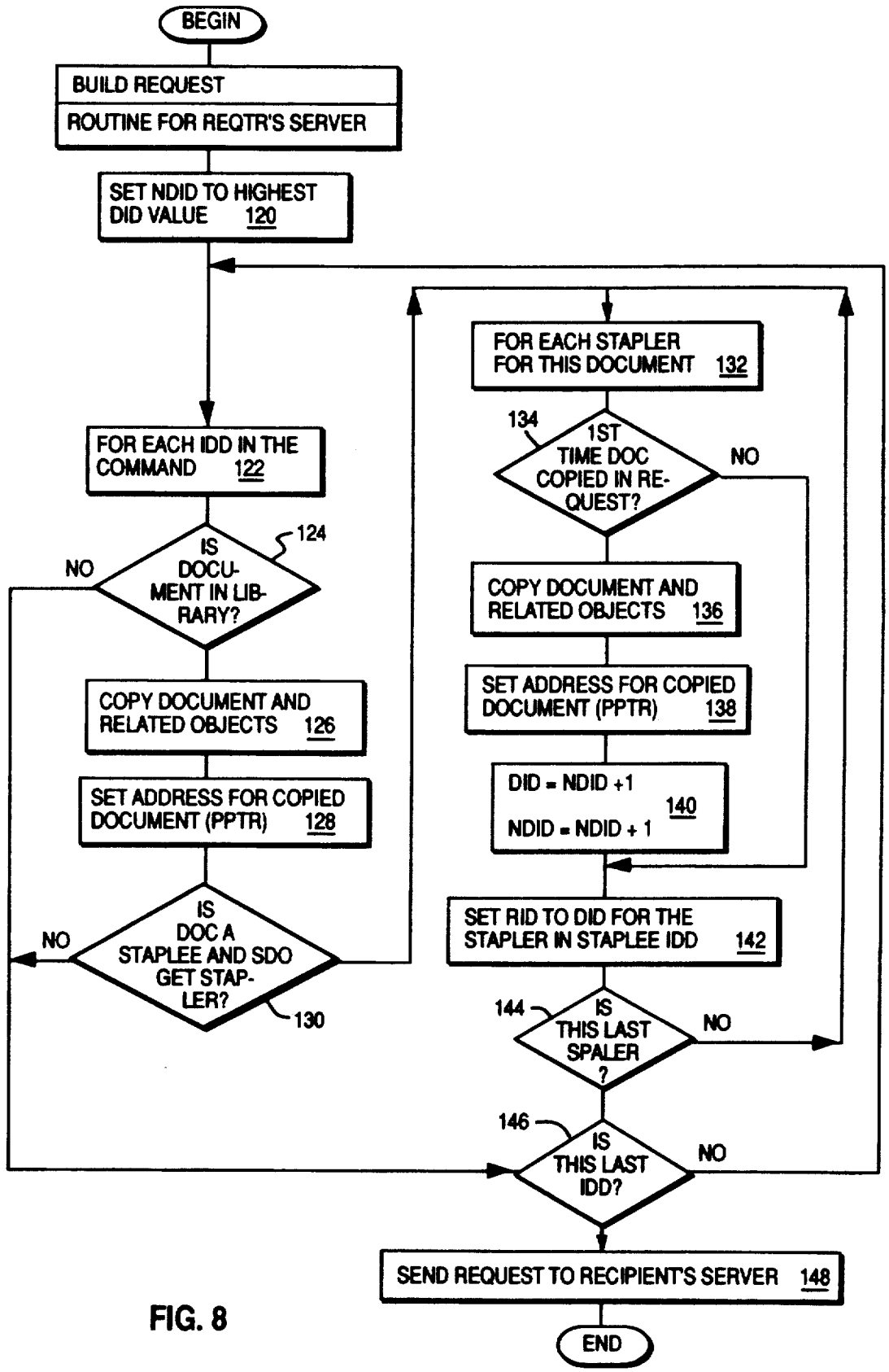
FIG. 8 is a flowchart representing distribution of stapled documents received from a requestor application.

Referring to FIG. 8, there is shown a flow chart for the requester's server 18 in distributing stapled documents received from the requester application program 16. Step 120 sets the value of NDID equal to the highest DID value transmitted with the distribution request. The requester's server 18 examines each IDD passed with the distribution request, the requester's server 18, in steps 122 and 124, determines whether the document associated with the IDD is filed in the library 12. If the document is filed in the library, the document and its related objects are copied in step 126. All documents copied from the library 12 will be assigned new IDDs. Step 128 sets the address PPTR of the copied document to point to the position of the document in a request unit. Step 130 determines whether the document is a staples document and whether the stapled-document-option is set to distribute the attached documents or staplers. If the library document is a staplee and the stapled-document-option indicates that staplers are to be distributed, then step 132 and 134 determines whether each of the stapler documents have been previously copied. The document in question may have appeared in another staple relationship to be distributed with this request. If the document in question has been previously copied, control is transferred to step 142 for the assignment of an additional RID for the new staple relationship. Otherwise, the document must be copied and each must have an IDD generated therefor as set forth in steps 136 and 138. Since each IDD is associated with a unique identifier (DID), step 140 set document DID equal to the next available identifier (NDID+1) and then increment the value of the next available identifier (NDID) by a value of one to correspond to the next available unique identifier.

Step 142 sets the reference document identifier RID to correspond to the stapler document identifier for the staples document (staplee RID=stapler DID). Step 144 determines whether the last stapler document has been processed and transfer control to step 132 to process any remaining stapler documents. Otherwise, step 146 determines whether all IDDs have been processed. If there are other IDDs to be processed, control is transferred to step 122. If every IDD has been processed, a completed distribution request is transmitted from the requester's server 18 to the recipient server 22 in step 148.

Set out below is an illustration of an application program useable by the recipient server 22 in receiving stapled documents within the information processing system. The program is in program design language from which source code and machine code are derivable.

```
BEGIN RECIPIENT SERVER PROC
  INPUT
    A COMPLETED DISTRIBUTION REQUEST
    INCLUDING:
      ADDRESSING AND DISTRIBUTION
      CHARACTERISTICS.
      A COPY OF EVERY DOCUMENT TO BE
      DISTRIBUTED.
      AN IDD OPERAND FOR EACH DOCUMENT TO
      BE DISTRIBUTED TO THE RECIPIENT(S)
      INCLUDING:
```

```
-continued
    A POINTER TO THE PHYSICAL COPY
    (PPTR).
    A UNIQUE IDENTIFIER (DID) FOR THIS
    IDD WITHIN THE SCOPE OF THE
    REQUEST.
    REFERENCE(S) (RIDs) FOR ANY
    STAPLERS ATTACHED TO THIS
    DOCUMENT.
    A DOCUMENT UNIT FOR EACH DOCUMENT
    PASSED WITH THIS REQUEST INCLUDING
    THE FOLLOWING:
        STAPLER DATA AREA WHICH INCLUDES
        THE STAPLER HISTORY ATTRIBUTE AND
        OTHER STAPLER CHARACTERISTICS AND
        THE LIST OF DOCUMENTS TO WHICH
        THIS DOCUMENT IS ATTACHED.
        STAPLEE DATA AREA WHICH INCLUDES
        THE STAPLEE HISTORY ATTRIBUTE AND
        OTHER STAPLEE CHARACTERISTICS AND
        THE LIST OF DOCUMENTS BY WHICH
        THIS DOCUMENT IS ATTACHED.
        FOLDER DATA.
        DOCUMENT-IN-FOLDER DATA.
        DOCUMENT DESCRIPTORS.
        DOCUMENT CONTENT.
PROCESS
    DO FOR EVERY DID IN THE COMMAND,
    IF THE DOCUMENT REFERENCES A STAPLER,
    THEN
        COPY THE STAPLER'S DID INTO THE
        DOCUMENT'S STAPLEE TABLE-OF-
        CONTENTS.
        COPY THE STAPLEE'S DID INTO THE
        STAPLER'S STAPLER TABLE-OF-
        CONTENTS.
    ENDIF
    ENDDO
    PLACE A POINTER TO THE RESOLVED
    DISTRIBUTION INTO THE RECIPIENT'S
    DOCUMENT QUEUE.
END RECIPIENT SERVER PROC
```

Figure 9:
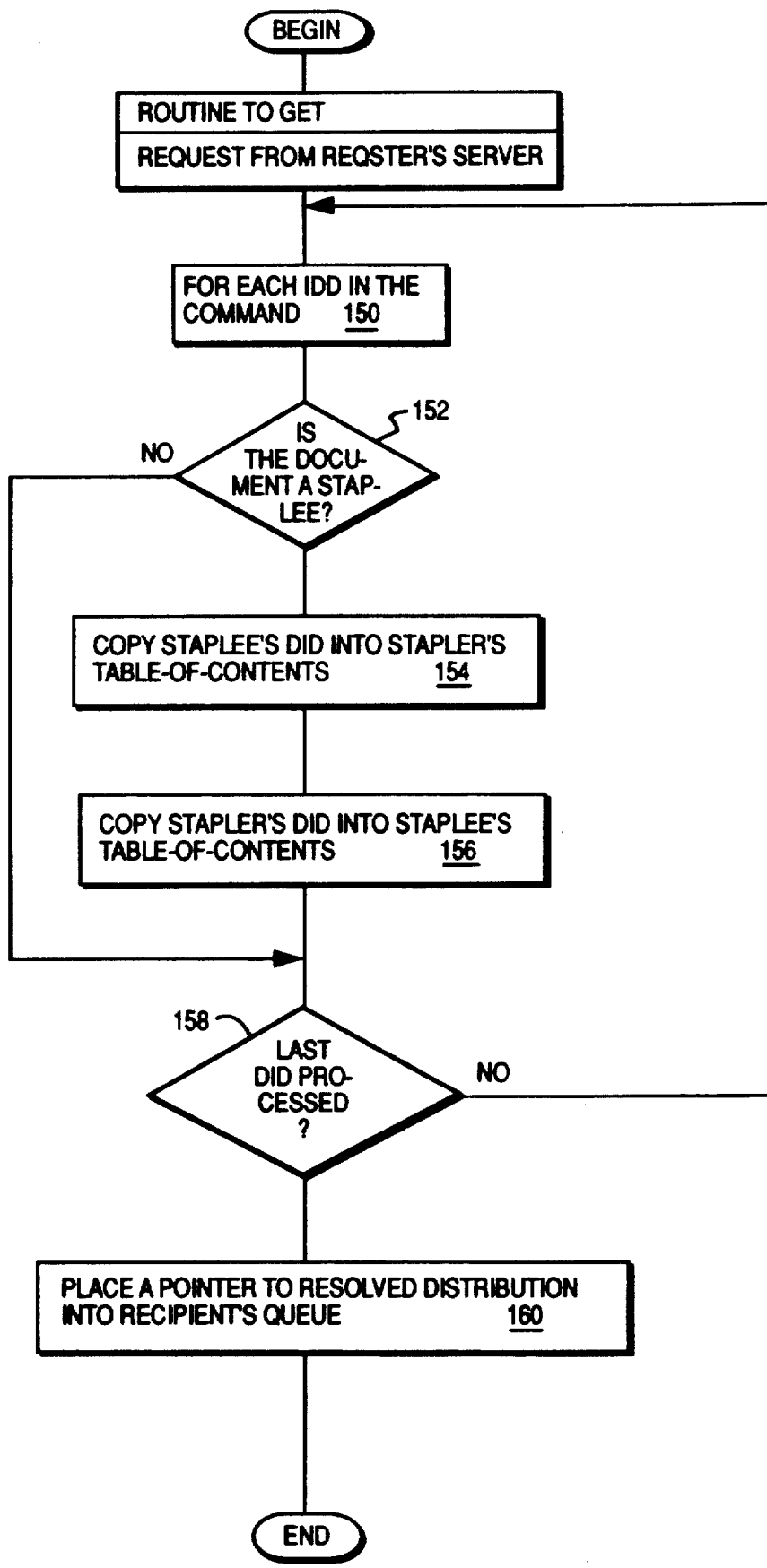
FIG. 9 is a flow chart for receiving a distribution request in accordance with the present invention.

Referring to FIG. 9, there is shown a flow chart for the recipient server 22 in receiving the distribution request from the requester's server 18. In steps 150 and 152, the recipient server 22 examines each document passed in the distribution request to determine whether each of the respective documents in the request is a staplee. The recipient server 22 will generate a stapler table-of-contents for each stapler document and a staplee table-of-contents for each staplee document attached by a stapler. In steps 154 and 156, an entry in a first document's staplee table-of-contents is generated for each stapler (RID) which is attached to the first document and an entry in each stapler's stapler table-of-contents is generated for each stapler (RID) which is attached to the first document. Step 158 determines whether there are documents to be processed and repeats steps 150 through 156 until all of the documents passed in the request have been processed. Step 160 places a pointer to the distribution in the recipient EU's document queue 24. The distribution now includes a copy of each document set forth in the request, the stapler table-of-contents for each stapler in the distribution and a staplee table-of-contents for every document which is attached by one or more staplers.

In summary, the invention relates to a unique method of distributing stapled documents within an information processing system. A first end user indicates to the system that, at least, one document is to be stapled to another and then transmitted to, at least, a second end user. The first end user enters data which identifies the documents to be stapled together, which of the documents is the staplee document and the stapler document, indicate whether the stapled-document-option is to be utilized and the addresses of one or more recipient end users. The system then builds the necessary structures to transmit the stapled documents to the identified end users.

While the invention has been particularly shown and described with reference to a preferred embodiment, it will be understood by those skilled in the art that various changes in form and detail may be made without departing from the spirit and scope of the invention.

What is claimed is:

1. In an information processing system having a plurality of documents stored therein, a method of distributing stapled documents to at least one end user of said system, said method comprising the steps of:

identifying by a first one of said end users, at least one of said plurality of documents having a directed relationship, said documents within said directed relationship are stapled documents, and at least one end user, other than said first end user to receive said identified document having a directed relationship and defining the stapled documents by indicating that a first of at least two of said plurality of documents is stapled by another of said plurality of documents and by indicating the physical location of said at least two of said plurality of documents to be distributed; and processing, by said information processing system to transmit an electronic representation of said identified at least one of said plurality of documents and other documents in said directed relationship associated with said identified at least one document to said at least one of said identified end users.

2. The method as recited in claim 1 further includes the step of specifying an address within said system for said at least one other of said identified end users.

3. The method as recited in claim 2 further includes the step of maintaining said directed relationship of said stapled documents such that said stapled documents are received by said at least one other of said identified end users having the same directed relationship.

4. The method as recited in claim 3 further includes specifying distribution characteristics for said stapled documents.

5. The method as recited in claim 1 further includes the step of indicating whether a stapled-document option is to be applied to said defined stapled documents.

* * * * *